J. F. HUTCHINSON.
Dish-Pan.

No. 211,739. Patented Jan. 28, 1879.

WITNESSES:
C. Neveux
C. Sedgwick

INVENTOR:
J. F. Hutchinson
BY Munn & Co
ATTORNEYS.

UNITED STATES PATENT OFFICE.

JEREMIAH F. HUTCHINSON, OF PORTLAND, MAINE, ASSIGNOR TO HIMSELF AND EDWARD M. DAY, OF SAME PLACE.

IMPROVEMENT IN DISH-PANS.

Specification forming part of Letters Patent No. 211,739, dated January 28, 1879; application filed June 7, 1878.

*To all whom it may concern:*

Be it known that I, JEREMIAH F. HUTCHINSON, of Portland, in the county of Cumberland and State of Maine, have invented a new and Improved Dish-Pan, of which the following is a specification:

The object of my invention is to furnish a pan in which dishes may be washed having connected thereto a drainer for laying the dishes upon, to allow the superfluous water to run off, and to construct the same in a compact form, so that all the parts can be readily cleansed, and are not liable to become misplaced and lost.

Strainers have been used in connection with dish-pans, detachably connected thereto and supported upon legs, so that the drainage from the dishes may return to the dish-pan.

Figure 1:
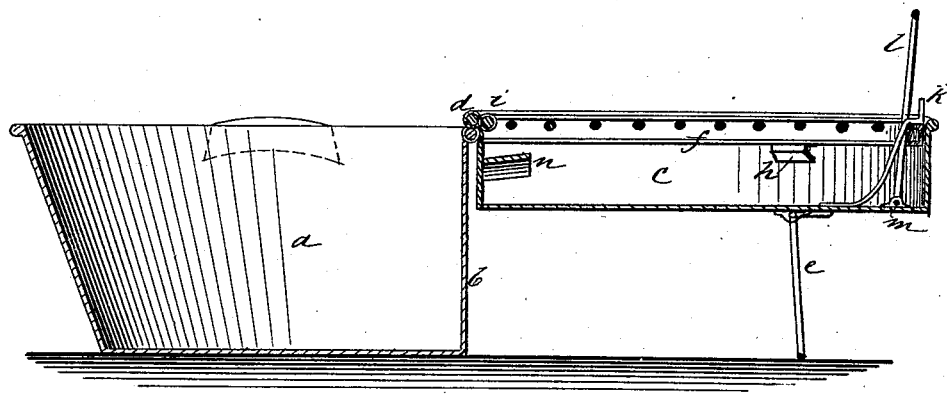
Figure 2:
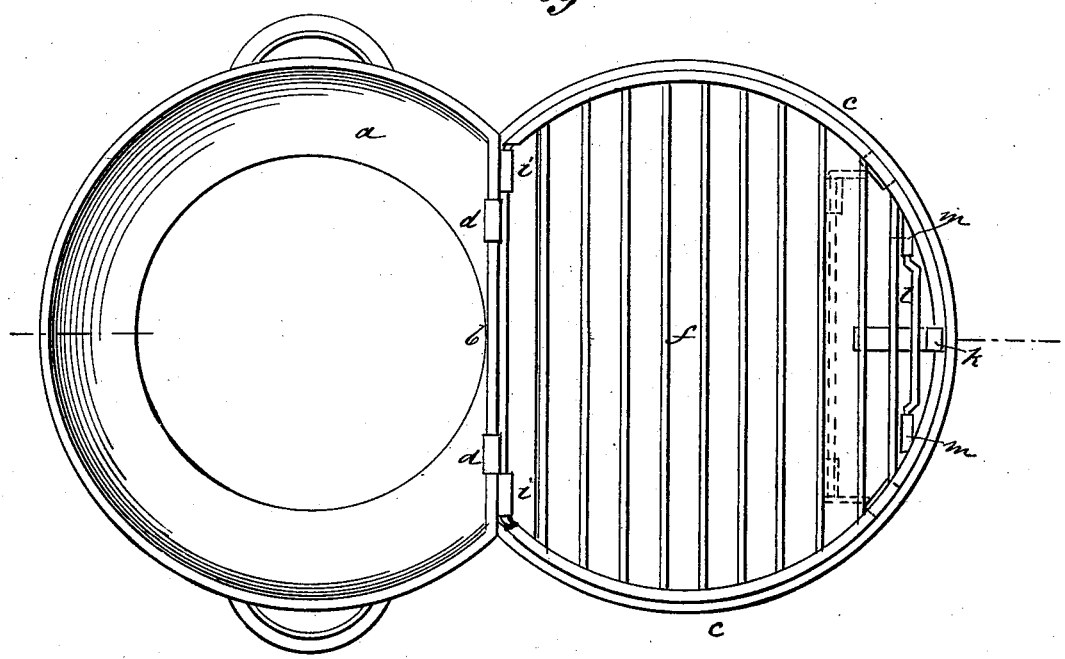

In the drawings, Figure 1 is a vertical section of my improved dish-pan as open for use, and Fig. 2 is a plan of the same.

Similar letters of reference indicate corresponding parts.

$a$ is the pan for holding the water. This is of usual shape, except that the side at $b$ is flattened. $c$ is the cover, united to the pan $a$ at its flattened side by a hinge, $d$. The cover $c$ is formed as a shallow pan, so that it may retain the water from the dishes. $e$ is a wire frame hinged to the inside of the cover $c$, to allow it to be turned down flat upon the cover, or raised up to form a support for the cover $c$ when it is turned back for use, as shown in Fig. 1. $f$ is a circular drainer or grid, hinged at $i$ to the cover $c$, so as to set inside the rim of the cover, and held up flush with the rim by lugs or projections $h$ inside the cover $c$. $k$ is a spring-catch taking over the rim of the drainer $f$ to keep the same in place, and allowing the drainer to be raised for cleaning the inside of the cover. $l$ is a rest or support to hold the dishes in an inclined position as they are laid upon the drainer $f$. This rest $l$ is hinged to the inside of the cover at $m$, and is turned down thereon when the pan is not in use. When the pan is in use the rest $l$ is raised in the position shown in the drawing. $n$ is a rigid lip secured to the rim of the cover $c$, serving, when the cover $c$ is closed upon the pan $a$, to return the water in the cover $c$ to the pan $a$.

By this construction the article is complete in itself, every part can be readily cleansed, and there are no detachable pieces liable to be mislaid or lost.

The dishes, as washed, are laid upon the drainer $f$, and the water from them runs into the cover $c$, where it is retained until the pan is closed.

The strainer $f$ and cover $c$ are both hinged together at one place on the flattened edge of the pan $a$, which allows the strainer to be raised separately or turn with the cover $c$. This is permitted by placing the hinge-plates upon the hinge-pin of the cover $c$.

I do not confine myself to the exact shape or construction of the parts as shown, as they may be varied without departing from my invention.

Having thus fully described my invention, I claim as new and desire to secure by Letters Patent—

1. The combination, with a hinged pan-shaped cover, $c$, and a hinged drainer, $f$, of the lugs $h$ and spring-catch $k$, arranged as and for the purpose specified.

2. The rest $l$, hinged to the inside of the cover at $m$, combined with a drainer, $f$, to hold the dishes in an inclined position, as shown and described.

3. The combination, with the wash-pan $a$, of a pan-shaped cover, $c$, provided with the lip $n$, as and for the purpose set forth.

4. The cover $c$, provided with the drainer $f$, dish-support $l$, lip $n$, and leg $e$, in combination with the dish-pan $a$, to which the cover is hinged, as set forth.

JEREMIAH FOWLES HUTCHINSON.

Witnesses:
GEORGE A. ULMER,
HOWARD DOUGLASS.